July 29, 1969 J. EICHELMANN 3,458,145
STATOR WINDING APPARATUS
Filed June 12, 1967 2 Sheets-Sheet 1
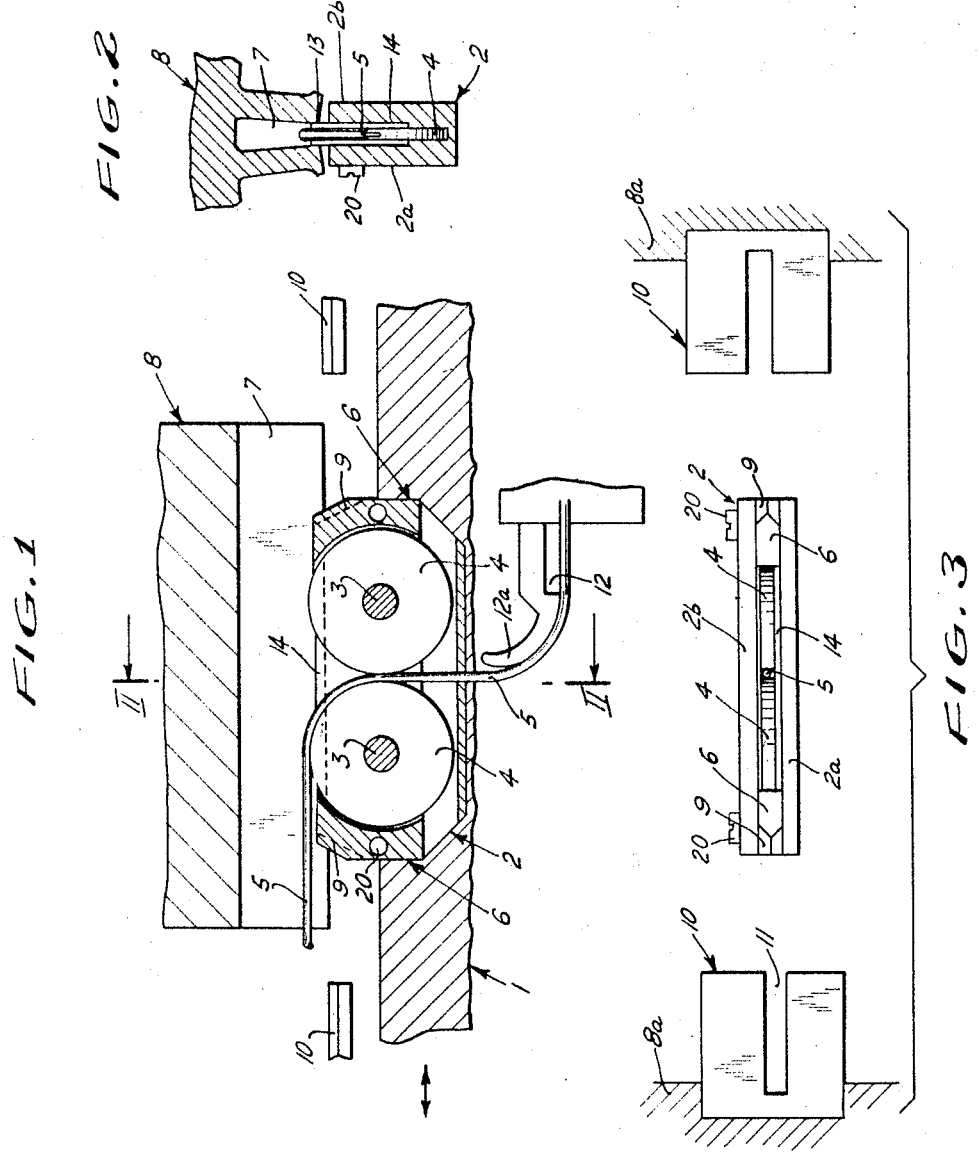
INVENTOR
JOHANNES EICHELMANN
BY Michael S Striker
ATTORNEYS

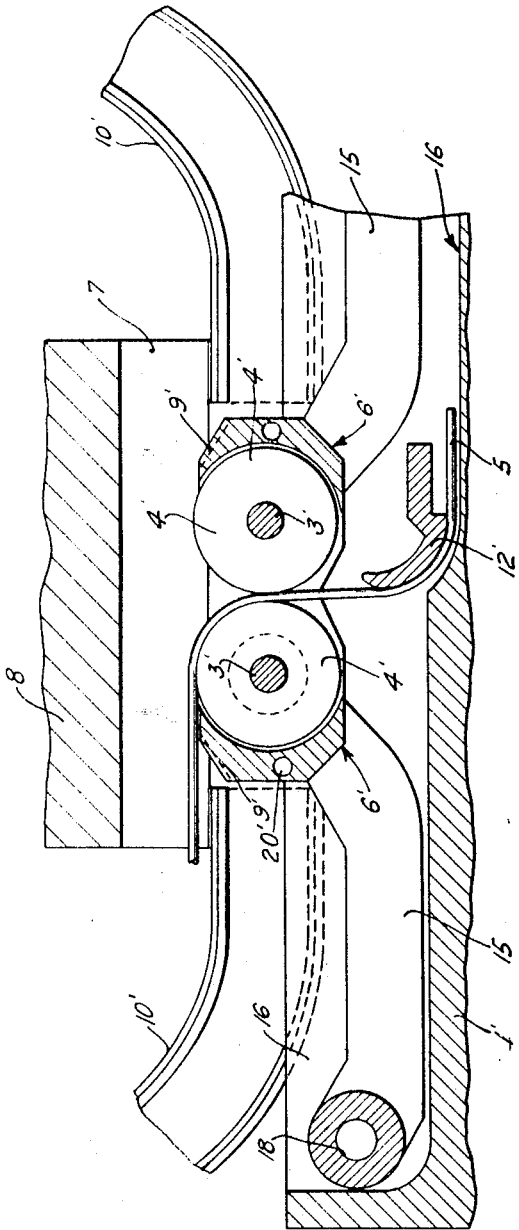
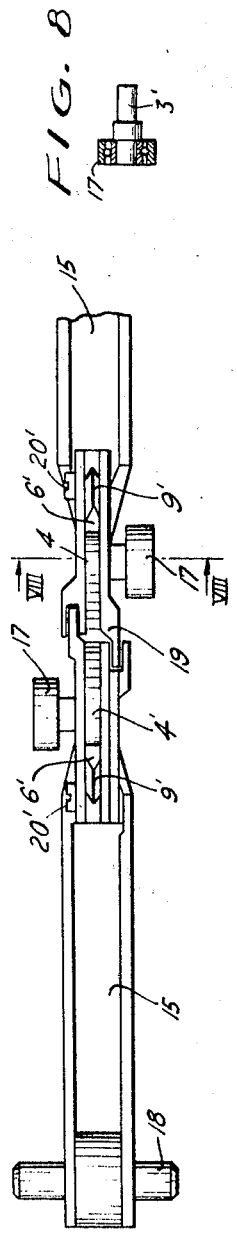
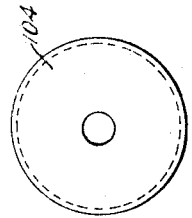
INVENTOR
JOHANNES EICHELMANN
BY
Michael S. Striker
ATTORNEYS United States Patent Office 3,458,145
Patented July 29, 1969

3,458,145
STATOR WINDING APPARATUS
Johannes Eichelmann, Dresden, Germany, assignor to
VEB Elktromat, Dresden, Germany
Filed June 12, 1967, Ser. No. 645,302
Int. Cl. B65h 81/06
U.S. Cl. 242—1.1                    17 Claims

ABSTRACT OF THE DISCLOSURE

Apparatus for laying insulated conductors into slots provided in laminated stators, rotors or analogous slotted parts of electrical machines. It comprises a pair of coplanar rolls mounted on a one-piece or composite guide which is reciprocated by a conveyor, and a pair of shields which flank the rollers and extend into the inlet of the slot while the guide travels along the slot. The shields center the rollers and the rollers straighten the conductor which is fed through a gap therebetween. Portions of the rollers extend into the slot between and beyond the shields, and the leading edges of shields taper in directions away from the adjoining rollers so as to facilitate entry of such shields into the ends of slots.

Background of the invention

The present invention relates to apparatus for laying of conductors or similar flexible wire-like products, and more particularly to improvements in an apparatus which may be utilized for introduction of insulated conductors into slots machined into or otherwise formed in rotors, stators or analogous magnetizable parts of electrical machines.

It is already known to provide an apparatus which is used to introduce conductors into the slots of stators with a lever which is tiltable on an arm and carries a wire-feeding nozzle at one end. Such apparatus are not entirely satisfactory, mainly because the stator coil contains a greater length of conductor material than a manually formed coil and also because the factor which indicates (in percent) the extent to which the slots are filled is too low. Furthermore, such apparatus are incapable of introducing relatively heavy conductors (whose diameter approximates or exceeds 1.5 mm.) without causing damage to or destruction of the insulating material and/or of the current-conducting strands in the interior of the conductor.

It is also known to utilize rollers which feed the conductor into the slot of a stator. Apparaus utilizing such rollers are more satisfactory but their utilization necessitates expensive and time-consuming preliminary treatment of stators, such as the application of protective coats to the surfaces bounding the inlets of the slots and/or removal of fins, burrs and like appendages from the surfaces around the inlets. Other types of apparatus utilize nozzles which extend directly into the slots and feed the conductor into the deepmost portions of such slots. The aforementioned "slot-filling" factor of such apparatus is unsatisfactory, mainly because the conductor tends to curl as soon as it leaves the nozzle and to move away from the bottom of the slot. Moreover, such apparatus are also likely to damage the insulation of the conductor.

Accordingly, it is an important object of my invention to provide an apparatus which can insert one or more conductors into the slots of stators, rotors or analogous parts of electrical machines in such a way that the insulation of conductors is protected from damage and that the conductors are compelled to remain in their assigned positions without curling or arching.

Another object of the invention is to provide an apparatus which can insert relatively thin or relatively thick conductors and which can be utilized without necessitating any preliminary treatment of slotted parts.

A further object of the invention is to provide an apparatus which can be used to insert one or more conductors at a time, which automatically straightens or unbends the conductors during insertion, and which is constructed in such a way that successively introduced lengths of a conductor act upon previously introduced lengths to reduce their tendency to change their position in the slot.

An additional object of the invention is to provide an apparatus which can introduce conductors into slots whose inlets are just wide enough to permit entry of conductors.

A concomitant object of the invention is to improve such types of presently known apparatus wherein the conductor is introduced by means of rollers.

Summary of the invention

The improved apparatus serves to introduce or lay wire-like conductors into elongated slots provided in stators, rotors or analogous magnetizable parts of electrical machines. It comprises guide means which may include a channel-shaped member of a pair of pivotable fingers, conveyor means for moving the guide means in a predetermined path extending along a slot in a magnetizable part which is installed in a holder located adjacent to such path, a pair of coplanar rollers rotatably carried by the guide means and having portions arranged to extend into a slot during travel of the guide means in the aforementioned path, a nozzle which feeds the conductor lengthwise through a gap between the rollers and is movable with the guide means, and a pair of shields flanking the rollers and mounted on the guide means in such a way that portions thereof extend into the slot whereby one of the shields enters the slot ahead of the rollers and the other shield enters the slot behind the rollers. The one shield centers the rollers in the slot and the other shield steers the guide means from behind. The rollers compel the conductor to remain in the slot. Each shield is preferably provided with an edge portion which tapers away from the adjoining roller and extends into the slot. Such tapering portions insure that the rollers can enter a slot even though the latter is not in exact registry with the guide means.

The conveyor means may include an endless chain and may carry two or more guide means. If the guide means resembles a channel-shaped body, the apparatus preferably further comprises a pair of plate-like locators which are adjacent to the end faces of rollers and also extend into the inlet of the slot when the guide means is caused to travel in the aforementioned path.

The apparatus further comprises ways provided at the ends of the path of travel of the shields to guide the shields and the rollers when the leading shield moves beyond the slot. Such ways may be installed on the holder which supports the slotted part.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is a fragmentary longitudinal sectional view of an apparatus which embodies one form of my invention, further showing a slotted stator one slot of which is in the process of receiving a conductor;

FIG. 2 is a transverse section through the apparatus as seen in the direction of arrows from the line II—II of FIG. 1;

FIG. 3 is a top plan view of the apparatus, with the conveyor means omitted;

FIG. 4 is a fragmentary longitudinal sectional view of a second apparatus;

FIG. 5 is a top plan view of the second apparatus with the conveyor means omitted;

FIG. 6 is an elevational view of a modified roller;

FIG. 7 is a plan view of the roller shown in FIG. 6; and

FIG. 8 is a section as seen in the direction of arrows from the line VIII—VIII of FIG. 5.

Description of the preferred embodiments

Referring first to FIGS. 1 to 3, there is shown a stator 8 having slots 7 (only one shown) which taper toward their inlets 13 in a manner as illustrated in FIG. 2. The apparatus for introducing conductors 5 into slots 7 comprises a conveyor or support 1 which accommodates a channel-shaped one-piece guide 2. The conveyor 1 may be constituted by a rigid arm or by a roller chain. The guide 2 has two side walls 2a, 2b (FIG. 2) supporting two parallel shafts 3 which carry flat coplanar rollers 4 defining between themselves a gap for the conductor 5. The rollers 4 are installed in and their upper portions extend beyond the space between the side walls 2a, 2b. This space further accommodates two wedge-like centering elements or shields 6 which extend from the guide 2 and flank the outwardly extending portions of rollers 4 with requisite clearance to avoid a braking action. The leading edges 9 of the shields 6 taper in directions away from the adjoining rollers 4 to facilitate introduction into a slot 7 and to place the guide 2 into registry with such slot while the conveyor 1 travels in a straight path with reference to the stator 8, or vice versa. It is assumed that the conveyor 1 travels in the longitudinal direction of the slot 7 so that one of the tapered edges 9 is caused to enter the adjoining end of the slot and is followed by the rollers 4 and the other shield 6.

The apparatus further comprises ways 10, provided with recesses or channels 11 and disposed at the ends of the slot 7 to confine the leading shield 6 during travel beyond the respective end of the stator 8. The channels 11 are shown in FIG. 3. The ways 10 are secured to the holder 8a for the stator 8.

In the embodiment of FIGS. 1 to 3, the thickness of the rollers 4 is somewhat less than the width of the inlet 13 so that these rollers can be placed between a pair of lateral plate-like locators 14 which enable the apparatus to introduce conductors 5 into very narrow slots of small stators without any damage to insulation on the conductors. The locators 14 may consist of sheet metal.

The conductor 5 is supplied by a nozzle 12 and is guided along an arcuate deflector 12a to advance through an aperture in the conveyor 1 and into and through the gap or nip between the rollers 4. These rollers guide the conductor 5 during entry of one of the shields 6 into the adjoining end of the slot 7. The conveyor 1 is caused to travel in parallelism with the axis of the stator 8 and the bevelled leading edge 9 places the guide 2 into registry with the slot 7 so that portions of the rollers 4 enter the inlet 13 and travel lengthwise of the slot. Successive increments of the conductor 5 are laid into the bottom zone of the slot 7 and such increments are held against movement toward the inlet 13 by the rollers 4. If the conveyor 1 of FIG. 1 travels in a direction to the right, the rollers 4 will cause the conductor 5 to enter the slot 7 and to remain therein while the right-hand shield 6 travels toward the right-hand ways 10. This leading or right-hand shield 6 protects the insulation on the conductor 5 against damage because it centers the exposed portions of rollers 4 in the inlet 13. When the leading shield 6 leaves the slot 7, it enters the channel 11 of the adjoining right-hand ways 10 and cooperates with the trailing shield 6 (which continues to travel in the slot 7) to center the rollers 4 in the inlet 13.

The leading shield 6 separates from the adjoining surfaces of the slotted part 8 flashes or analogous projections which could damage the insulation on the conductor 5.

FIGS. 4 and 5 illustrate a second embodiment of my apparatus. The shields 6' are mounted on rigid guide fingers 15 which are constituted by levers and are pivotable on pins 18 (only one shown) carried by a conveyor 1'. The free end portions of guide fingers 15 also support the rollers 4' and these fingers are mounted in recesses 16 machined into the upper face of the conveyor 1'. The shafts 3' of rollers 4' are provided with roller followers 17 which track the faces of suitably configurated ways 10' adjacent to the ends of the slot 7. The ways 10' constitute cams and take over the guidance of rollers 4' when the leading shield 6' moves beyond the end of the slot 7. A coupling device 19 including a male portion on the left-hand finger 15 of FIG. 5 and a female portion on the right-hand finger connects the followers 17 to prevent misalignment of the fingers 15. The roller followers 17 constitute the outer races of antifriction bearings mounted on shafts 3' (see FIG. 8). The manner in which a nozzle 12' supplies the conductor 5 into the gap between the rollers 4' is the same as described in connection with FIGS. 1 to 3. The shields 6' are provided with tapered edges 9'.

The peripheral surfaces of the rollers 4 or 4' may be flat or slightly concave to insure even more accurate guidance of the conductor 5 during travel through the inlet 13 and into the interior of the slot 7. If the conductor 5 comprises two or more parallel strands, the peripheral surfaces of the rollers may be provided with V-shaped or prismatic grooves (see the roller 104 of FIGS. 6 and 7). Such grooves may be formed by precision grinding. It is further clear that the apparatus of my invention is equally suited for insertion of conductors into slotted rotors or any other slotted parts of electrical machines wherein the conductors, wires or like flexible products must be inserted with a high degree of precision to avoid damage to inserted material or to surfaces surrounding the slots.

The shields 6, 6' are detachable from the guide members 2, 15 (see the screws 20 and 20' in FIGS. 1–3 and 5) so that the apparatus can be converted for laying of conductors into narrower or wider slots. The extent to which the shields project into a slot 7 is preferably slightly less than the penetration of rollers 4 or 4' to avoid damage to insulating sheath on the conductor 5.

It was found that my improved apparatus is capable of laying conductors without any damage to the insulation and/or to the current-conducting strands, even if the part 8 is not subjected to any preliminary treatment, such as removal of flashes from surfaces bounding the slot 7 and/or coating of such surfaces with protective sheets. The aforementioned "slot-filling" factor is calculated by the equation $$f_n = \frac{d_{is}^2 \cdot n}{Q}$$

wherein $d_{is}$ is the diameter of the conductor, $n$ is the number of conductors in a slot, and $Q$ is the cross-sectional area of the slot. In laying of conductors with the apparatus of FIGS. 1 to 5, the average value of the factor $f_n$ was found to be 100 percent. This is attributed to the fact that the rollers 4 or 4' effect a straightening of conductor lengths in the slot by urging a freshly introduced length against the previously introduced lengths, i.e., by causing a freshly laid portion of the conductor to bear against the previously laid portions. Such mode of operation avoids damage to the insulation because smoothing or straightening of successively laid conductor portions takes place in response to engagement between insulating layers. Highly satisfactory results were achieved with very thin as well as with relatively thick conductors.

As stated before, each nozzle 12 or 12' can discharge two or more conductors at a time and the conveyor 1 or 1' can carry two or more sets of rollers 4, 4' and an equal number of pairwise arranged shields 6 or 6'.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. Apparatus for introducing wire-like conductors into elongated slots provided in stators, rotors and analogous parts of electrical machines, comprising guide means; conveyor means for moving said guide means in a predetermined path extending along a slot in a machine part; a pair of coplanar rollers rotatably carried by said guide means and having portions arranged to extend into a slot during travel of said guide means in said predetermined path, said rollers defining between themselves a gap through which the conductor is fed into the slot during said travel of the guide means; and a shield provided on said guide means ahead of one of said rollers to extend into the slot during said travel of the guide means.

2. Apparatus as defined in claim 1, wherein said shield tapers in the direction away from the adjoining roller.

3. Apparatus as defined in claim 2, wherein said conveyor means is arranged to reciprocate the guide means in said path and further comprising a second tapering shield provided on said guide means outwardly adjacent to the other roller and arranged to extend into the slot during travel of said guide means, one of said shields being located ahead of said rollers and extending into the slot during travel of said guide means in one direction and the other shield being located ahead of said rollers and extending into the slot during travel of said guide means in the other direction.

4. Apparatus as defined in claim 3, wherein said guide means resembles a channel-shaped body and defines an internal space accommodating portions of said rollers and said shields.

5. Apparatus as defined in claim 4, further comprising a pair of locating means provided in said channel-shaped body adjacent to the axial ends of said rollers and having portions extending into the slot during travel of said guide means in said path.

6. Apparatus as defined in claim 5, wherein each of said locating means is constituted by a thin plate.

7. Apparatus as defined in claim 3, wherein said guide means comprises two lever-shaped fingers each having a first end portion pivoted to said conveyor means and a second end portion carrying one of said rollers and one of said shields.

8. Apparatus as defined in claim 7, wherein said conveyor means is provided with slot means receiving the first end portions of said fingers.

9. Apparatus as defined in claim 8, further comprising coupling means connecting the second end portions of said fingers.

10. Apparatus as defined in claim 3, further comprising ways for guiding said guide means during a portion of travel of such guide means in said path.

11. Apparatus as defined in claim 10, wherein said ways are disposed at the ends of said path.

12. Apparatus as defined in claim 11, wherein said ways are provided with channels each arranged to receive one of said shields on movement of such one shield beyond the respective end of the slot.

13. Apparatus as defined in claim 11, wherein each of said rollers has a follower arranged to track one of said ways during travel toward one end of said path.

14. Apparatus as defined in claim 3, further comprising additional guide means provided on said conveyor means.

15. Apparatus as defined in claim 3, further comprising nozzle means carried by said conveyor means and arranged to feed the conductor into the gap between said rollers.

16. Apparatus as defined in claim 1, wherein the peripheral surfaces of said rollers are grooved.

17. Apparatus as defined in claim 3, further comprising means detachably mounting said shields.

References Cited

UNITED STATES PATENTS

| 3,025,008 | 3/1962 | Nill et al. | 242—1.1 |
| 3,334,825 | 8/1967 | Friedrich | 242—1.1 |

FOREIGN PATENTS 583,600  10/1958  Italy.

OTHER REFERENCES

Josef Watzula: DAS 1,024,157, Feb. 13, 1958.

BILLY S. TAYLOR, Primary Examiner